(12) United States Patent
Itoh

(10) Patent No.: US 8,805,062 B2
(45) Date of Patent: Aug. 12, 2014

(54) IMAGE PROCESSING APPARATUS, COMPUTER READABLE MEDIUM FOR PROCESSING IMAGE AND METHOD FOR PROCESSING IMAGE

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 219 days.

(21) Appl. No.: 13/033,163

(22) Filed: Feb. 23, 2011

(65) Prior Publication Data

US 2012/0020552 A1 Jan. 26, 2012

(30) Foreign Application Priority Data

Jul. 20, 2010 (JP) ................... 2010-162810

(51) Int. Cl.
*G06K 9/00* (2006.01)
(52) U.S. Cl.
USPC ........................................... 382/162
(58) Field of Classification Search
USPC ......................................... 382/103, 162–167
See application file for complete search history.

(56) References Cited

U.S. PATENT DOCUMENTS

| 6,141,433 | A  | * | 10/2000 | Moed et al. | 382/103 |
| 6,701,010 | B1 |   | 3/2004  | Katsuyama   |         |
| 6,990,235 | B2 |   | 1/2006  | Katsuyama   |         |
| 2003/0021462 | A1 | * | 1/2003 | Sakai et al. | 382/144 |
| 2004/0165773 | A1 | * | 8/2004 | Katsuyama   | 382/173 |

FOREIGN PATENT DOCUMENTS

| JP | A-11-288465  | 10/1999 |
| JP | A-2006-078299 | 3/2006 |

* cited by examiner

*Primary Examiner* — Alex Liew
(74) *Attorney, Agent, or Firm* — Oliff PLC

(57) ABSTRACT

An image processing apparatus includes an influence value setting unit that sets an influence value on a pixel of interest in a local region of an image, the influence value being a color difference in the local region, and a color region processing unit that treats the pixel of interest as a pixel in a region of a representative color when a color of the pixel of interest is within a range from the representative color to the threshold value, the threshold value being set such that the threshold value increases as the influence value increases.

10 Claims, 11 Drawing Sheets

FIG.2C COLOR DIFFERENCE 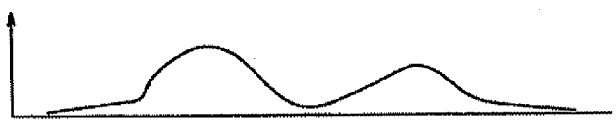
FIG.2D DIFFERENTIAL VALUE (ABSOLUTE VALUE) 
FIG.2E INFLUENCE VALUE 

BOUNDARY BETWEEN COLORS   BOUNDARY BETWEEN COLORS
FIG.9B COLOR DIFFERENCE 
FIG.9C DIFFERENTIAL VALUE (ABSOLUTE VALUE) 
FIG.9D DISTANCE 
FIG.9E INFLUENCE VALUE 

IMAGE PROCESSING APPARATUS, COMPUTER READABLE MEDIUM FOR PROCESSING IMAGE AND METHOD FOR PROCESSING IMAGE

CROSS-REFERENCE TO RELATED APPLICATION

This application is based on and claims priority under 35 U.S.C. 119 from Japanese Patent Application No. 2010-162810 filed on Jul. 20, 2010.

BACKGROUND

1. Technical Field

The present invention relates to an image processing apparatus, a computer readable medium for processing an image and a method for processing an image.

2. Related Art

As image processing, for example, the following processes have been performed: a process that limits the number of colors used in an image to several representative colors and divides the image into the regions of the representative colors; and a process that converts the colors used into representative colors and generates a limited color image. In the processes, colors other than the representative colors in the image are incorporated into the representative colors.

SUMMARY

According to an aspect of the invention, there is provided an image processing apparatus including:

an influence value setting unit that sets an influence value on a pixel of interest in a local region of an image, the influence value being a color difference in the local region; and a color region processing unit that treats the pixel of interest as a pixel in a region of a representative color when a color of the pixel of interest is within a range from the representative color to the threshold value, the threshold value being set such that the threshold value increases as the influence value increases.

BRIEF DESCRIPTION OF THE DRAWINGS

Exemplary embodiments of the present invention will be described in detail based on the following figures, wherein:

FIGS. 2A to 2G are diagrams illustrating an example of the operation of the first exemplary embodiment of the invention;

FIGS. 9A to 9E are diagrams illustrating an example of an influence value according to the second modification of the second exemplary embodiment of the invention;

DETAILED DESCRIPTION

Figure 1:
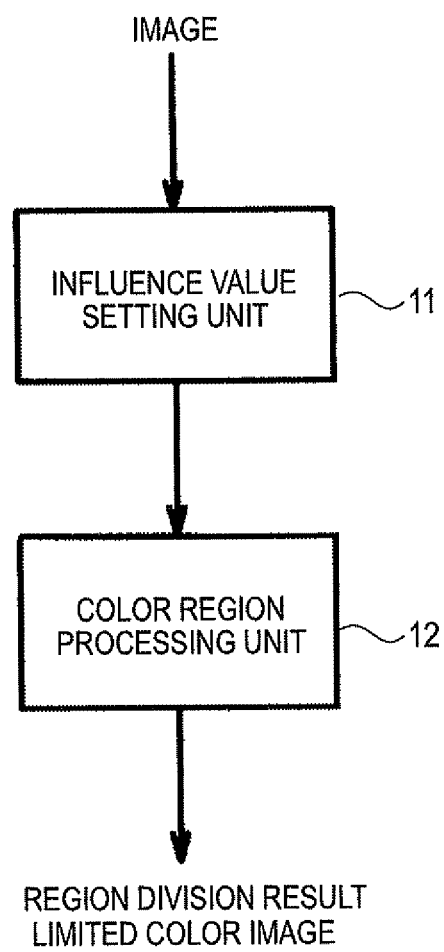
FIG. 1 is a diagram illustrating the structure of a first exemplary embodiment of the invention.

FIG. 1 is a diagram illustrating the structure of a first exemplary embodiment of the invention. In FIG. 1, reference numeral 11 indicates an influence value setting unit, and reference numeral 12 indicates a color region processing unit. When an image to be processed is given, the following units sequentially process pixels in the image as pixels of interest. In addition, one or plural representative colors used in the image to be processed are extracted in advance.

The influence value setting unit 11 sets a color difference in a local region that includes the pixel of interest and has a predetermined size as an influence value on the pixel of interest. As the influence on the pixel of interest increases, the influence value increases. The influence value may be, for example, the difference (absolute value) between the average color of the local region and the color of the pixel of interest or the differential value (absolute value) of a variation in the color of the pixel of interest. The total sum of the color differences between the pixels in the local region or the maximum value of the color difference may be used as the color difference. Alternatively, the total sum of the products of the color difference between the pixels and the distance between the pixel of interest and the pixel closest to the pixel of interest among the pixels, or the maximum value thereof may be used. In addition, the influence value may be calculated by the following function using a combination of the color difference and the differential value:

$$\text{Influence value} = \alpha \times \text{color difference} + \beta \times \text{differential value} + \delta$$

(where coefficients $\alpha$, $\beta$, and $\delta$ are positive numbers).

The influence value may be calculated by, for example, the sum of products or the product in addition to the linear sum. Of course, the influence value may be calculated by characteristics other than the above, or a combination of the characteristics. The influence value may be set with reference to at least one of the color components. Of course, the influence value may be set with reference to two color components or three color components.

The color region processing unit 12 sets a threshold value according to the influence value set by the influence value setting unit 11. When the color of the pixel of interest is within the range from one of predetermined representative colors to the threshold value, the pixel of interest is regarded as a pixel in the region of the representative color. The pixels in the image are classified as the pixels of interest into some regions of the representative colors. In this way, the pixels are divided into the regions of each representative color. The color of the pixel in the divided region is converted into the representative color of each region, thereby limiting the color of the image.

Figure 2A:
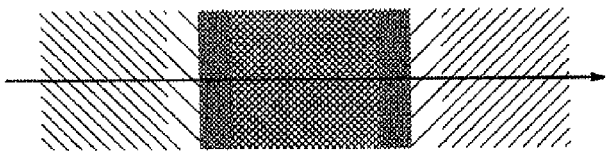
Figure 2B:
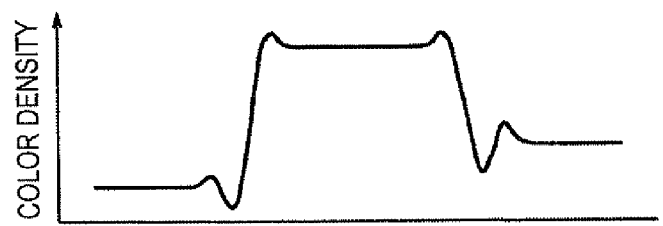

FIGS. 2A to 2G are diagrams illustrating an example of the operation of the first exemplary embodiment of the invention. FIG. 2A is a diagram illustrating a portion of an image, in which color differences are represented by different oblique lines. In this example, for example, an emphasis process is performed such that there are a lower-color-density portion and a higher-color-density portion at the boundaries between a central portion with high color density and low-color-density portions disposed on both sides of the central portion. FIG. 2B shows a variation in the color density of a row of pixels represented by an arrow in FIG. 2A.

In this example, the emphasis process causes a color that was not present before the emphasis process to appear as disturbance in the vicinity of the boundary. In addition, when an image reading apparatus reads an image, the boundary between different colors is blurred due to an error in reading. Therefore, the color of the blurred portion is different from the original color. In the case of an image compressed by lossy block coding, such as JPEG, it is confirmed that a color which has not been used appears at the boundary between colors due to block noise. As such, when disturbance is superimposed on an image to be processed and a color different from the colors used appears, in some cases, the image is divided into color regions including the region of the color different from the colors used during the division of the color regions. In addition, during conversion into a limited color image, in some cases, the portion on which disturbance is superimposed is converted into a different color.

The influence value setting unit 11 sets the influence value on the basis of a variation in the color of the image. FIG. 2C shows the absolute value of a variation in color difference from the average value of a local region and FIG. 2D shows a variation in the differential value. The influence value is calculated from these values by, for example, the above-mentioned function. In this exemplary embodiment, it is assumed that the influence value shown in FIG. 2E is calculated. The influence value increases as the pixel of interest approaches a portion with a large color difference, such as the boundary between colors. The term "influence value" is used for a characteristic value obtained from a color difference to facilitate understanding of the tendency that the influence value of the pixel of interest increases as the pixel of interest approaches the boundary between the colors.

Figure 2F:
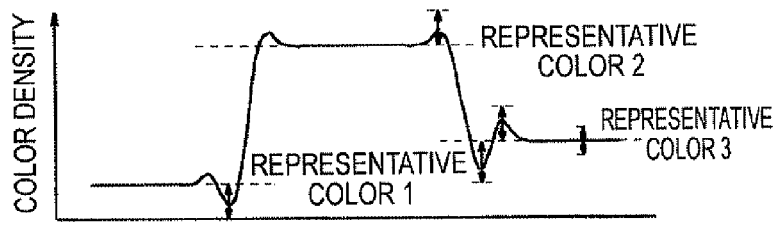

The color region processing unit 12 sets a threshold value according to the influence value set by the influence value setting unit 11 and determines the region of a representative color on the basis of the threshold value. For example, as the influence value shown in FIG. 2E increases, the threshold value increases, and as the influence value decreases, the threshold value decreases. For example, the influence value may be used as the threshold value. The threshold value set in this way increases as the pixel of interest approaches a portion in which there is a color difference and decreases when there is no color difference. FIG. 2F shows the threshold value applied to the variation in color density shown in FIG. 2B as a double-headed arrow line. The color of the range of the double-headed arrow line is determined as the region of a representative color. Referring to FIG. 2F, since the threshold value increases as the pixel of interest approaches a portion in which there is a color difference, the pixel of interest is likely to be included in the region of an adjacent pixel. This shows that, even when there is a variation in color at the boundary between the colors, the pixel of interest is less likely to be affected by the variation.

Figure 2G:
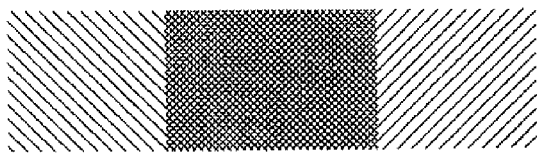

FIG. 2G shows the processed image. In the example shown in FIG. 2A, a variation in color density occurs in a portion in which different colors are adjacent to each other, but is integrated into the region of each representative color.

Figure 3:
FIG. 3 is a diagram illustrating an example of an influence value.

FIG. 3 is a diagram illustrating another example of the influence value. In the example of the influence value shown in FIG. 2E, the influence value is calculated from the color difference from the average value of the local region and the differential value of the image. However, FIG. 3 shows an example of easily setting the influence value. For example, FIG. 3 shows an example in which the influence value is set to 1 when the color difference from the average value of the local region is equal to or less than a predetermined value and the influence value is set to 2 when the color difference is more than the predetermined value. As such, even when the influence value is set in this way, the color of the pixel of interest is incorporated into the region of each representative color without being affected by a color variation in a portion in which colors are adjacent to each other.

In FIGS. 2A to 2G and FIG. 3, a one-dimensional variation has been described. However, the local region may be a two-dimensional region and the influence value may be set in two dimensions.

Figure 4:
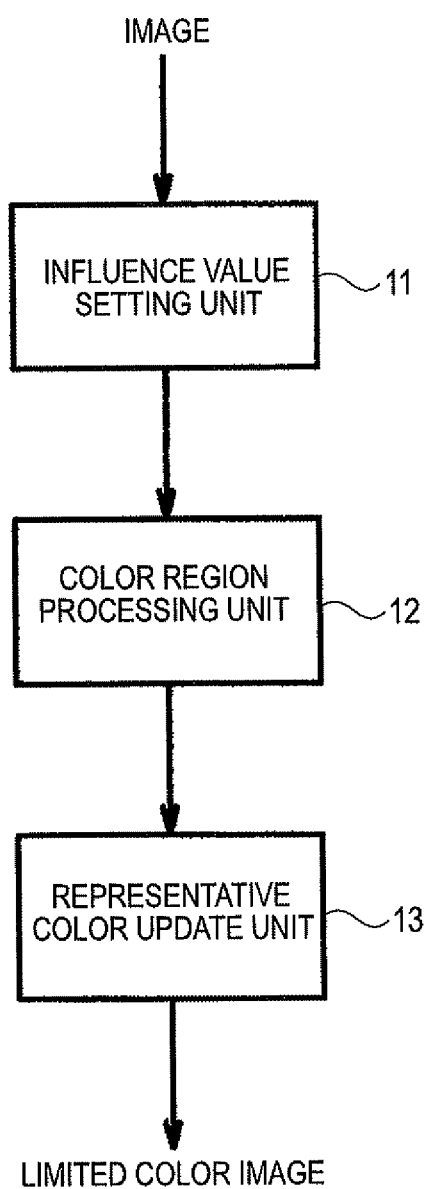
FIG. 4 is a diagram illustrating the structure of a modification of the first exemplary embodiment of the invention.

FIG. 4 is a diagram illustrating the structure of a modification of the first exemplary embodiment of the invention. In FIG. 4, reference numeral 13 indicates a representative color update unit. In this modification, when a limited color image is formed, the representative color of each region is calculated again.

The representative color update unit 13 calculates a weighted average value weighted to an influence value corresponding to the pixel of interest for the region of each representative color after the color region processing unit integrates each pixel of interest and updates the representative color. The weight is reduced as the influence value increases. As described above, in some cases, the color of the pixel with a large influence value is affected by different color regions. Therefore, the influence of the color of the pixel is not reflected in the update of the representative color. When the color of the pixel in the color region is replaced with the representative color updated by the representative color update unit 13, a limited color image with a color identical to the color of the image to be processed is obtained.

Figure 5:
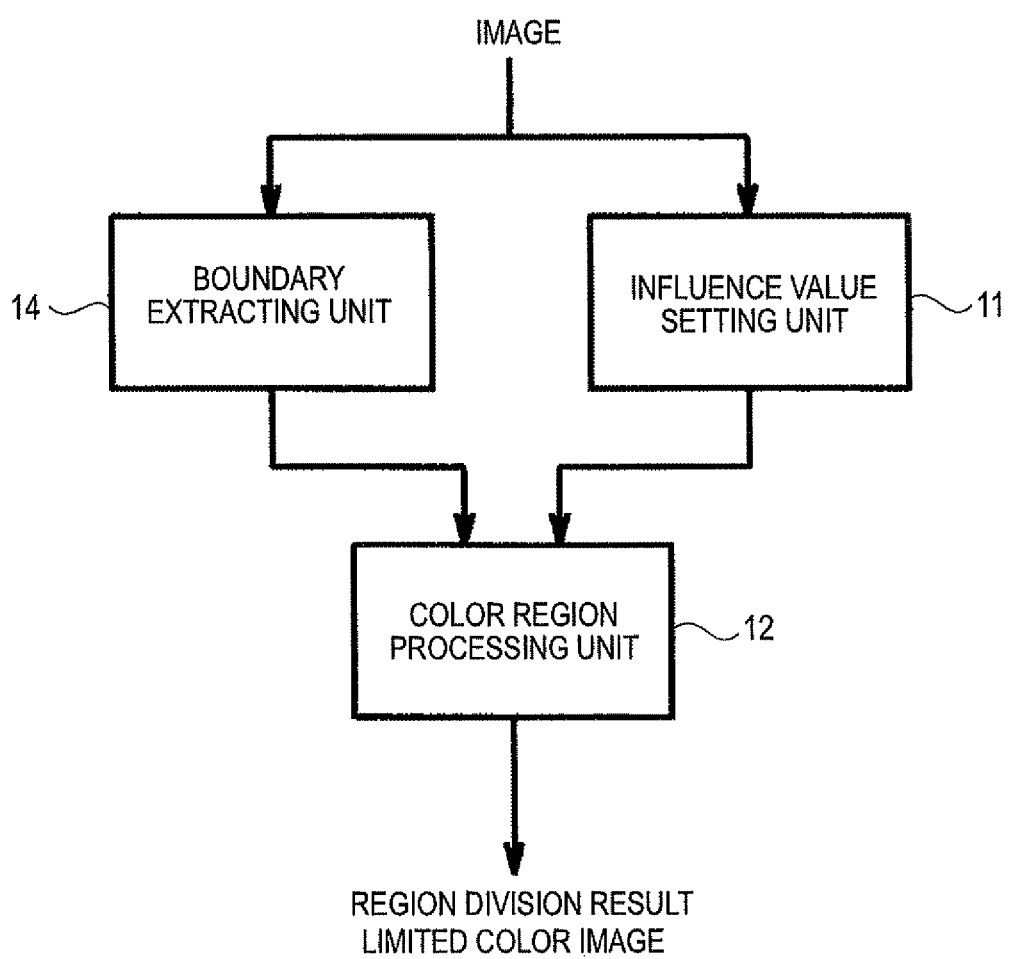
FIG. 5 is a diagram illustrating the structure of a second exemplary embodiment of the invention.

FIG. 5 is a diagram illustrating the structure of a second exemplary embodiment of the invention. In FIG. 5, reference numeral 14 indicates a boundary extracting unit. In the second exemplary embodiment, the boundary extracting unit 14 is provided in addition to the structure according to the first exemplary embodiment.

The boundary extracting unit 14 extracts the boundary between colors from an image to be processed. A known method may be used to extract the boundary between colors. For example, at least one color component may be binarized on the basis of a local average value and the binary boundary (changing point) may be extracted as the boundary between colors. Of course, the boundary between colors may be extracted from two color components or three color components. In this case, the boundaries between colors extracted from the color components may be combined with each other.

In the second exemplary embodiment, the color region processing unit 12 performs integration into the region of each representative color considering the boundary between colors extracted by the boundary extracting unit 14. For example, the pixels (color regions) which are adjacent to each other with the boundary between colors interposed therebetween are not incorporated such that the region of the representative color is not continuous across the boundary between colors. In this process, for example, the threshold value of the representative color in which the pixels adjacent to each other with the boundary between colors interposed therebetween are incorporated may be set to a small value, regardless of the influence value. When the boundary between colors is considered, the boundary between colors in the image to be processed is reflected in the boundary during the division of the region at that position or the limited color image.

When setting the influence value, the influence value setting unit 11 may divide the binary image generated by the boundary extracting unit 14 into one value and the other value, thereby setting the influence value. For example, when the value of the binary image corresponding to the pixel of interest is one value, for example, the color difference or the differential value may be calculated from the value of the pixel equal to the one value of the corresponding binary image among the pixels in a local region.

Figure 6A:
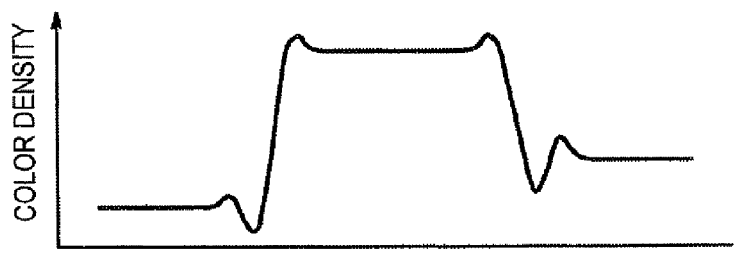
FIGS. 6A to 6D are diagrams illustrating an example of the operation of the second exemplary embodiment of the invention.

FIGS. 6A to 6D are diagrams illustrating an example of the operation of the second exemplary embodiment of the invention. FIG. 6A shows a variation in the color density of a row of pixels represented by the arrow in a portion of the image shown in FIG. 2A. There are a lower-color-density portion and a higher-color-density portion at the boundaries between a central portion with high color density and low-color-density portions disposed on both sides of the central portion, which has been described in FIGS. 2A and 2B.

Figure 6B:
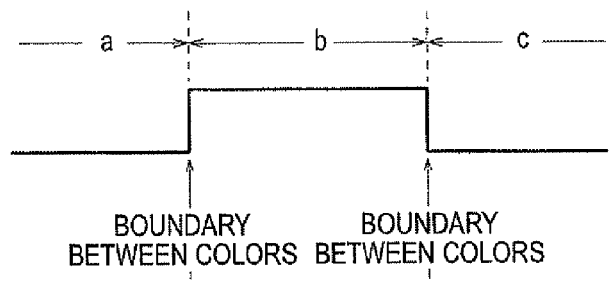

FIG. 6B shows the result binarized by the boundary extracting unit 14 on the basis of a local average value. The binary value varies at the boundary between colors. The boundary extracting unit 14 extracts the boundaries between colors. The regions a, b, and c are partitioned by the boundaries between colors.

Figure 6C:

FIG. 6C shows an example of the influence value set by the influence value setting unit 11. This example is shown in FIG. 2E.

The color region processing unit 12 sets a threshold value according to the influence value set by the influence value setting unit 11 and determines the region of a representative color on the basis of the threshold value. In this case, the region of the representative color is not continuous across the boundary between colors extracted by the boundary extracting unit 14. For example, the region b in the central portion is not continuous to the region a or the region c across the boundary between colors. In addition, neither the region a nor the region c is continuous to the region b. For example, as described in the first exemplary embodiment, a threshold value corresponding to the influence value is set and integration into the color region is performed. In this way, integration into the color region is performed without an influence on a variation in the color at the boundary between colors. However, in some cases, the integration is performed across the boundary between colors. The boundary extracting unit 14 extracts the boundary between colors and the color regions are not continuous across the boundary between colors. In this way, the color regions are separated from each other at the boundary between colors in the image to be processed.

Figure 6D:
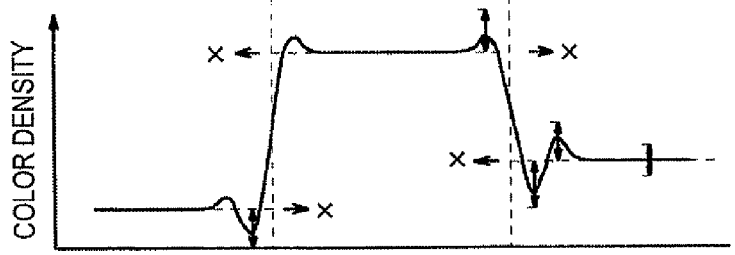

In FIG. 6D, a threshold value applied to the variation in color density shown in FIG. 6A is represented by a double-headed arrow line. When the color of each pixel of interest is in the range from the representative color to the threshold value, region integration is performed. As represented by "x" in FIG. 6D, region integration is not performed across the boundary between colors. Therefore, the color regions are separated from each other at the boundary between colors.

A one-dimensional variation has been described with reference to FIGS. 6A to 6D. However, the boundary between colors may be extracted in two dimensions and the influence value may be set in two dimensions.

Figure 7:
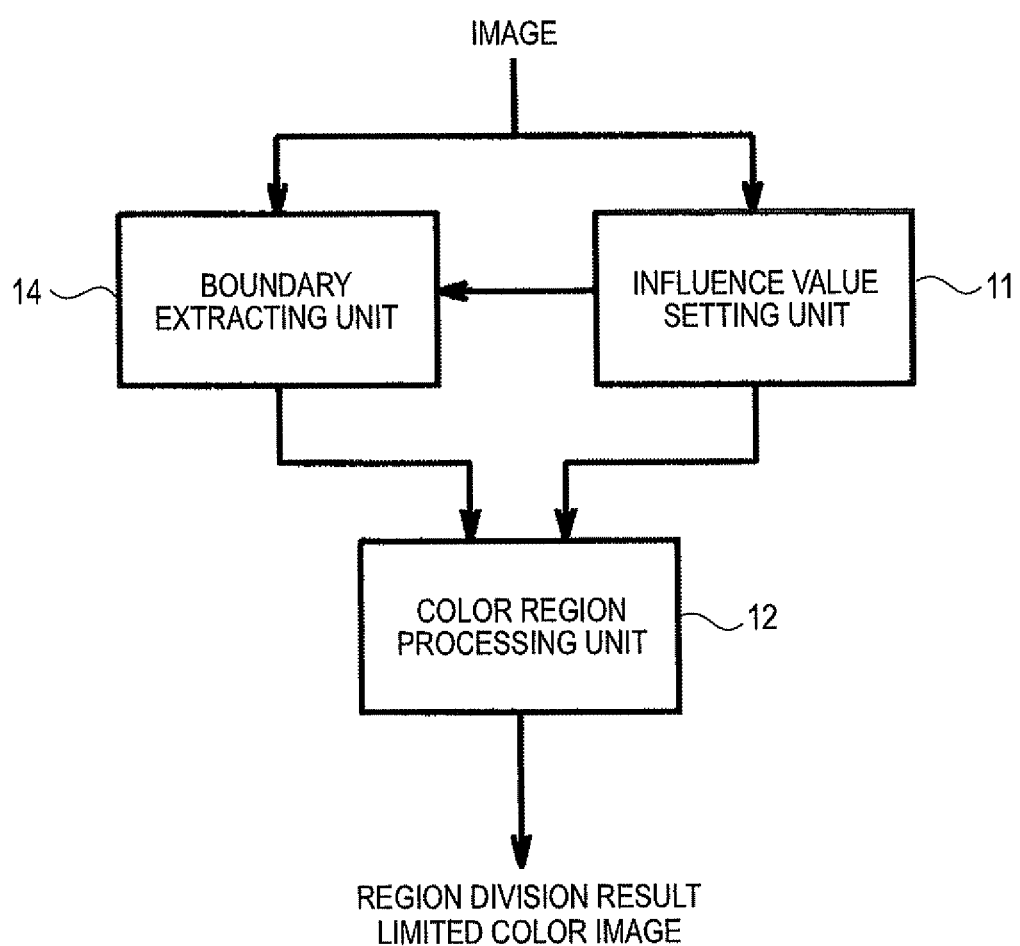
FIG. 7 is a diagram illustrating the structure of a first modification of the second exemplary embodiment of the invention.

FIG. 7 is a diagram illustrating the structure of a first modification of the second exemplary embodiment of the invention. In this modification, the boundary extracting unit 14 extracts the boundary between colors using the influence value set by the influence value setting unit 11. The influence value indicates an influence due to a color difference. Therefore, the influence value also indicates a portion in which there is a color difference and may also be used to extract the boundary between colors.

For example, the boundary extracting unit 14 extracts the boundary between colors in an image portion in which the influence value set by the influence value setting unit 11 is greater than a predetermined value. Alternatively, when the boundaries between colors extracted from plural color components are combined with each other, the color component having an influence value smaller than a predetermined value may not be used for the combination. Here, the influence value is calculated for each color component by the influence value setting unit 11.

Figure 8:
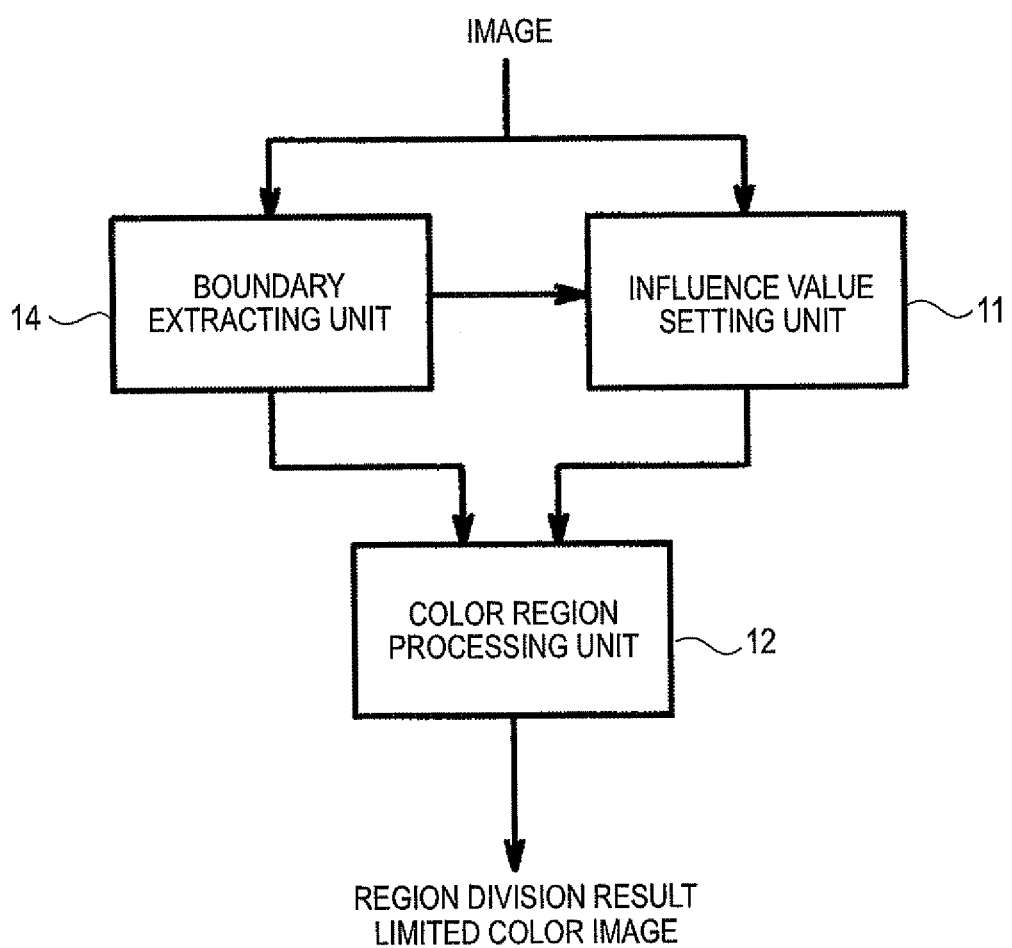
FIG. 8 is a diagram illustrating the structure of a second modification of the second exemplary embodiment of the invention.

FIG. 8 is a diagram illustrating the structure of a second modification of the second exemplary embodiment of the invention. In this modification, the influence value setting unit 11 uses the extraction result of the boundary between colors by the boundary extracting unit 14 to set the influence value.

When setting the influence value, the influence value setting unit 11 may set the influence value indicating that, as the pixel of interest approaches the boundary between colors extracted from the boundary extracting unit 14, an influence on the pixel of interest increases. For example, the distance from the boundary between colors may be used to calculate the influence value. For example, the influence value may be calculated by the following function using a combination of, for example, the color difference and the differential value described in the first exemplary embodiment:

$$\text{Influence value} = \alpha \times \text{color difference} + \beta \times \text{differential value} - \gamma \times \text{distance} + \delta$$

(where coefficients $\alpha$, $\beta$, $\gamma$, and $\delta$ are positive numbers).

Alternatively, the sum of the products of the color difference or the differential value and the reciprocal of the distance may be calculated. Of course, the influence value may be calculated by the sum of products or the product in addition to the linear sum, and characteristics other than the above may be used combinedly to calculate the influence value. In addition, the influence value may be set with reference to at least one of the color components. Of course, the influence value may be set with reference to two color components or three color components.

Figure 9A:
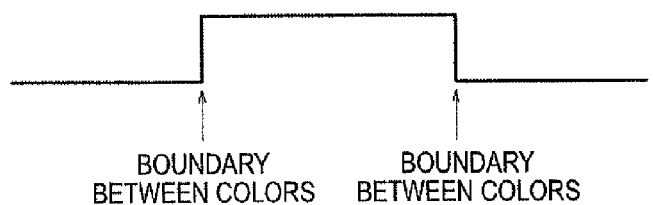

FIGS. 9A to 9E are diagrams illustrating an example of the influence value according to the second modification of the second exemplary embodiment of the invention. FIG. 9A shows the binarization result of the local average value by the boundary extracting unit 14, which is shown in FIG. 6B. The binary value is changed at the boundary between colors. FIG. 9B shows the absolute value of a variation in color difference from the average value of a local region and FIG. 9C shows a variation in the differential value, which are shown in FIGS. 2C and 2D, respectively.

The distance from the boundary between colors is used and operates in a predetermined range. The distance from the boundary between colors is reduced as the pixel of interest approaches the boundary between colors, and the distance from the boundary between colors increases as the pixel of interest is farther away from the boundary between colors. As shown in FIG. 9D, the distance from the boundary between colors is treated as a value that is changed in a predetermined range. The function expression of the influence value includes the distance as a negative term. The absolute value of $\gamma \times$ distance is reduced as the pixel of interest approaches the boundary between colors in the predetermined range. Therefore, the influence value increases as the pixel of interest approaches the boundary between colors. An example of the obtained influence value is shown in FIG. 9E.

Figure 10:
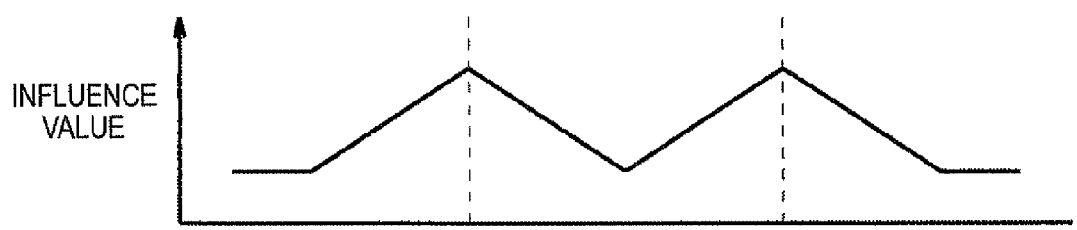
FIG. 10 is a diagram illustrating another example of the influence value according to the second modification of the second exemplary embodiment of the invention.

FIG. 10 is a diagram illustrating another example of the influence value according to the second modification of the second exemplary embodiment of the invention. In this example, in a predetermined range of the distance from the boundary between colors, as the distance from the boundary between colors is reduced, the influence value increases. This may be used when it is easy to set the influence value, as compared to when the color difference or the differential value is used.

In the examples shown in FIGS. 9A to 9E and FIG. 10, for example, the color difference, the differential value, and the distance may be calculated in two dimensions and the influence value may be set in two dimensions.

In the second exemplary embodiment, the representative color update unit 13 according to the modification of the first exemplary embodiment shown in FIG. 4 may be provided to recalculate the representative color in each color region.

Figure 11:
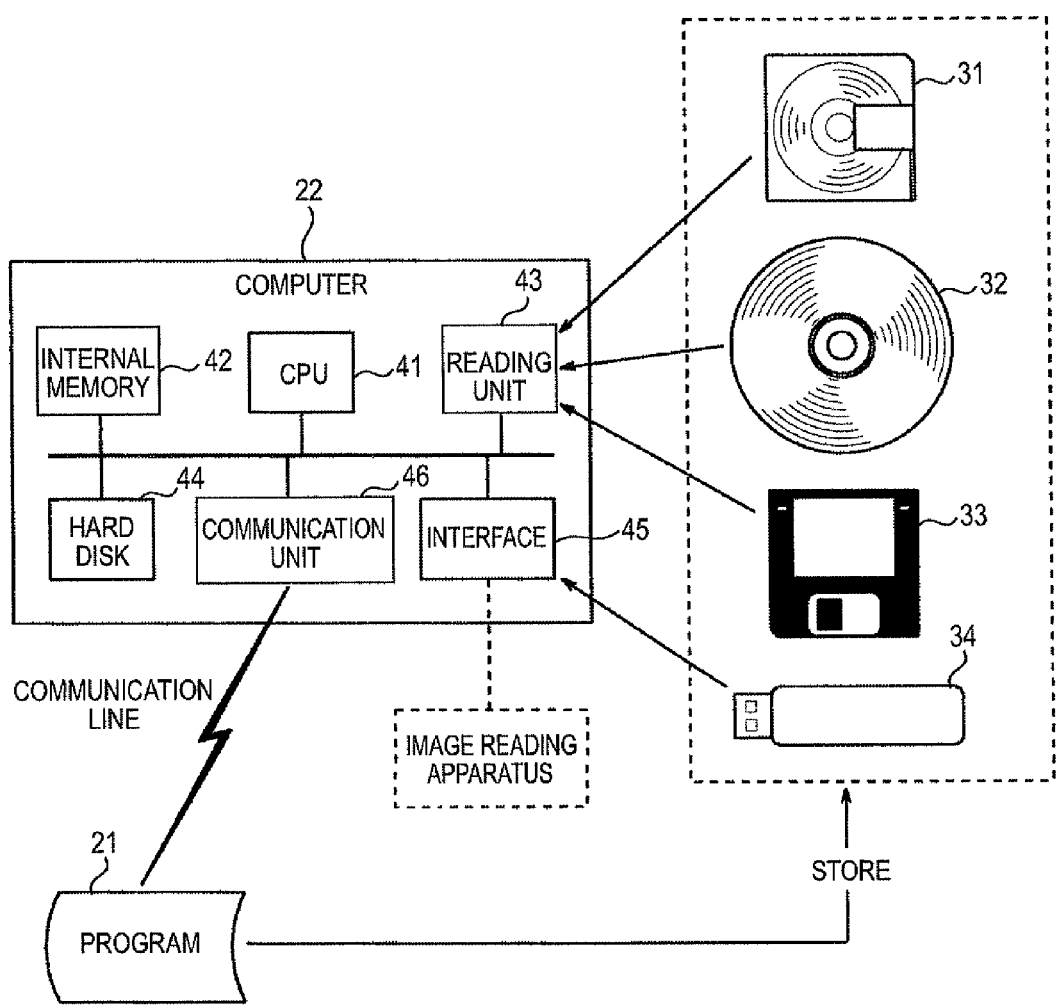
FIG. 11 is a diagram illustrating an example of a computer program for implementing the functions according to each exemplary embodiment of the invention, a storage medium that stores the computer program, and a computer.

FIG. 11 is a diagram illustrating an example of a computer program for implementing the functions according to each of the above-described exemplary embodiments of the invention, a storage medium that stores the computer program, and a computer. In FIG. 11, reference numeral 21 indicates a program, reference numeral 22 indicates a computer, reference numeral 31 indicates a magneto-optical disc, reference numeral 32 indicates an optical disc, reference numeral 33 indicates a magnetic disk, reference numeral 34 indicates a memory, reference numeral 41 indicates a CPU, reference numeral 42 indicates an internal memory, reference numeral 43 indicates a reading unit, reference numeral 44 indicates a hard disk, reference numeral 45 indicates an interface, and reference numeral 46 indicates a communication unit.

The program 21 may allow the computer to implement all or some of the functions of each unit according to the above-described exemplary embodiments of the invention and the modifications thereof. In this case, for example, the program and data used by the program may be stored in a computer-readable storage medium. The storage medium causes a change in the state of energy, such as magnetism, light, or electricity, in the reading unit 43 provided in the hardware resources of the computer according to the description content of the program, and transmits the description content of the program to the reading unit 43 in the format of signals corresponding to the change in the state. Examples of the storage medium include the magneto-optical disc 31, the optical disc 32 (including, for example, CD or DVD), the magnetic disk 33, and the memory 34 (including, for example, an IC card, a memory card, and a flash memory). These storage media are not limited to a portable type.

The program 21 is stored in the storage medium and the storage medium is inserted into, for example, the reading unit 43 or the interface 45 of the computer 22. Then, the computer reads the program 21 and stores the read program in the internal memory 42 or the hard disk 44 (including, for example, a magnetic disk or a silicon disk). The CPU 41 executes the program 21 to implement all or some of the functions according to each exemplary embodiment of the invention and the modifications thereof. Alternatively, the program 21 may be transmitted to the computer 22 through the communication line, the computer 22 may receive the program 21 using the communication unit 46 and store the program in the internal memory 42 or the hard disk 44, and the CPU 41 may execute the program 21 to implement all or some of the functions.

Various kinds of devices may be connected to the computer 22 through the interface 45. For example, a display unit that displays information or a receiving unit that receives information from the user may be connected to the computer 22. In addition, for example, an image reading apparatus may be connected to the computer 22 through the interface 45 and an image read by the image reading apparatus or an image subjected to image processing may be processed by the process according to each exemplary embodiment of the invention and the modifications thereof. The region division result or the color-limited image after the process may be transmitted to another program. Alternatively, the region division result or the color-limited image may be stored in the hard disk 44 or in a storage medium through the interface 45, or it may be transmitted to the outside through the communication unit 46. An image forming apparatus may be connected to the computer through the interface 45 and form the processed color-limited image.

Some or all of the functions may be formed by hardware. Alternatively, all or some of the functions according to each exemplary embodiment of the invention and the modifications thereof and other structures may be implemented by programs. When the program is applied to other purposes, the program may be integrated with programs for other purposes.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best exemplify the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. An image processing apparatus comprising:
   an influence value setting unit that sets an influence value on a pixel of interest in a local region of an image, the influence value being a color difference in the local region, and the local region being a two-dimensional area of a predetermined size smaller than the image; and
   a color region processing unit that treats the pixel of interest as a pixel in a region of a representative color when a color of the pixel of interest is within a range from the representative color to a threshold value, the threshold value being set such that the threshold value increases as the influence value increases.

2. The image processing apparatus according to claim 1, further comprising:
   a boundary extracting unit that extracts a boundary between colors,
   wherein the color region processing unit processes the region of the representative color so as not to be continuous across the boundary extracted by the boundary extracting unit.

3. The image processing apparatus according to claim 1, further comprising:
   a boundary extracting unit that extracts a boundary between colors,
   wherein the influence value setting unit sets larger influence value as the pixel of interest approaches the boundary extracted by the boundary extracting unit.

4. The image processing apparatus according to claim 2, wherein the boundary extracting unit combines extraction results of the boundaries between two or more color components.

5. The image processing apparatus according to claim 2, wherein the boundary extracting unit extracts the boundary between colors using the influence value set by the influence value setting unit.

6. The image processing apparatus according to claim 1, further comprising:
    a representative color update unit that updates the representative color by calculating a weighted average value for the region of each representative color into which each pixel of interest is incorporated by the color region processing unit, according to the influence value of the pixel of interest.

7. A non-transitory computer readable medium storing a program causing a computer to execute a process for processing an image, the process comprising:
    setting an influence value on a pixel of interest in a local region of an image, the influence value being a color difference in the local region, and the local region being a two-dimensional area of a predetermined size smaller than the image; and
    treating the pixel of interest as a pixel in a region of a representative color when a color of the pixel of interest is within a range from the representative color to a threshold value, the threshold value being set such that the threshold value increases as the influence value increases.

8. The image processing apparatus according to claim 3, wherein the boundary extracting unit combines extraction results of the boundaries between two or more color components.

9. The image processing apparatus according to claim 3, wherein the boundary extracting unit extracts the boundary between colors using the influence value set by the influence value setting unit.

10. A method for processing an image, comprising:
    setting an influence value on a pixel of interest in a local region of an image, the influence value being a color difference in the local region, and the local region being a two-dimensional area of a predetermined size smaller than the image; and
    treating the pixel of interest as a pixel in a region of a representative color when a color of the pixel of interest is within a range from the representative color to a threshold value, the threshold value being set such that the threshold value increases as the influence value increases.

* * * * *